US007847212B2

(12) United States Patent
Renz et al.

(10) Patent No.: US 7,847,212 B2
(45) Date of Patent: Dec. 7, 2010

(54) METHOD FOR THE MANUFACTURE OF A MOLDING AS WELL AS A SENSOR UNIT FOR THE APPLICATION THEREOF

(75) Inventors: Bernd Renz, Marbach (DE); Johannes Bauer, Illingen (DE); Stefan Braun, Ditzingen (DE); Nicole Weller, Ditzingen (DE)

(73) Assignee: Trumpf Werkzeugmaschinen GmbH & Co. KG, Ditzingen (DE)

( * ) Notice: Subject to any disclaimer, the term of this patent is extended or adjusted under 35 U.S.C. 154(b) by 1219 days.

(21) Appl. No.: 11/444,909

(22) Filed: May 31, 2006

(65) Prior Publication Data
US 2007/0037509 A1 Feb. 15, 2007

(30) Foreign Application Priority Data
May 31, 2005 (DE) .................. 10 2005 025 348

(51) Int. Cl.
*B23K 26/00* (2006.01)
*B29C 35/08* (2006.01)
(52) U.S. Cl. .................. 219/121.61; 264/400
(58) Field of Classification Search .......... 219/121.61–121.86; 264/400, 482, 219; 426/515
See application file for complete search history.

(56) References Cited
U.S. PATENT DOCUMENTS

| | | | | |
|---|---|---|---|---|
| 5,139,862 A * | 8/1992 | Swift et al. | ............. | 428/299.1 |
| 5,573,721 A * | 11/1996 | Gillette | ............. | 264/401 |
| 5,885,683 A * | 3/1999 | Swift | ............. | 428/88 |
| 6,215,093 B1 * | 4/2001 | Meiners et al. | ......... | 219/121.61 |
| 6,656,410 B2 * | 12/2003 | Hull et al. | ............. | 264/401 |
| 6,833,100 B2 * | 12/2004 | Klein | ............. | 264/219 |
| 2005/0116391 A1 * | 6/2005 | Lindemann et al. | ......... | 264/497 |

FOREIGN PATENT DOCUMENTS

EP 1 234 625 * 8/2002

* cited by examiner

*Primary Examiner*—Sang Y Paik
(74) *Attorney, Agent, or Firm*—Kriegsman & Kriegsman

(57) ABSTRACT

The invention relates to a method for the manufacture of a molding through generative processing methods, in particular through selective laser melting, wherein a model of a molding is built from a powder material according to CAD data, wherein an application unit is used to apply a powder layer and the powder layer applied is fixed to a layer arranged there under or a base plate by means of radiation, characterized in that prior to applying a first layer onto a build platform or a base plate, a sensor assembly having a sensor level which is located in relation to the levelling level of a levelling assembly for the applied powder layer is allocated to the build platform or the base plate, the build platform or the base plate is moved in relation to the sensor assembly until the sensor assembly emits a signal for stopping the build platform to a drive in an intermediate position, and starting from the intermediate position, the build platform or the base plate is moved by a distance to adjust the layer thickness of the first powder layer and is positioned in a starting position.

5 Claims, 3 Drawing Sheets

METHOD FOR THE MANUFACTURE OF A MOLDING AS WELL AS A SENSOR UNIT FOR THE APPLICATION THEREOF

BACKGROUND OF THE INVENTION

The invention relates to a method for the manufacture of a molding, in particular through selective laser melting, according to the pre-characterizing clause of Claim 1, and to a sensor unit, in particular for application of the method.

The present invention refers to a technology known as "rapid prototyping". Such methods are preferably used in product development, in order to reduce the product development time and to increase the product quality. In addition, this method allows manufacture of complex geometric shapes directly from a three-dimensional CAD model. For example, such a method has been disclosed in DE 196 49 865 C1.

The material powder is distributed over the build platform or the build space by means of a levelling assembly, for example through a linear movement of a slide levelling the material powder to the layer thickness desired. Whenever a layer has been treated with the laser beam, the levelling assembly distributes new powder over the component part that has been lowered by the thickness of the next layer to be applied. To allow a uniform application, EP 1 234 625 A1 discloses a levelling assembly which permits uniform application of the next powder layer to be treated, irrespective of any surface irregularities and elevations of the previously treated layer. To achieve this, said levelling assembly comprises at least a number of individual elements which can be displaced when moving over elevations. Preferred use is made of brushes or brushes arranged in a line.

In essence, the quality of the component parts depends on maintaining an exact thickness of the first powder layer which is applied onto a build platform or a base plate mounted on the build platform. If the first powder layer applied is too thick, there is the risk that the layer fails to comprise a sufficiently secure connection to the base plate. If the powder layer applied is too thin, this might result in height errors which may be continued while further layers are being built. If the levelling assembly is a rigid one, such as a slide or a grinding shaft, there is the risk that the levelling assembly collides with the build platform or the base plate if the powder layer is too thin. The presently manual adjustment of the build platform for achieving an exact thickness of the first powder layer is difficult in that the build platform is preheated to temperatures in excess of 250 degrees C., in order to prevent internal stresses from developing while the molding is being built. Where generative methods such as selective laser melting are utilized, the build platform is heated to temperatures of up to 500 degrees C; in exceptional cases, there might even be higher temperatures of up to 600 degrees C. This heating process causes considerable thermal expansions which also affect the position of the build platform. This complicates the adjustment of an exact thickness of the first powder layer for the manufacture of a molding.

SUMMARY OF THE INVENTION

For that reason, the invention aims at suggesting a method for the manufacture of a molding, in particular by laser melting, as well as a sensor unit for application of said method, permitting adjustment of the build platform for applying an exact thickness of the first powder layer.

This problem is solved by the invention by means of a method comprising the elements of Claim 1 and a sensor assembly.

The method according to the invention facilitates exact adjustment of the thickness of the first powder layer, irrespective of the heating temperature of the build platform and/or the base plate attached thereupon in a detachable manner as well as of the thermal expansions resulting therefrom in the build platform or base plate and the adjacent components. The adjustment of a starting position of the build platform for application of the first powder layer is achieved via an intermediate position which is defined for the powder layer to be applied by a sensor assembly in an indirect or direct manner. After the intermediate position has been detected by the sensor assembly, a drive subsequently lowers the build platform in relation to the sensor assembly by a distance corresponding to the thickness of the first powder layer, resulting in an exact adjustment of the starting position of the build platform for application of the first powder layer. Thereby, it is possible to eliminate any thermal elongations.

According to an advantageous embodiment, it is provided that a holding device receiving the sensor assembly and the levelling assembly moves over the build platform. The levelling assembly moves over the build platform once or repeatedly, for the purpose of applying the powder layer. The allocation of the sensor assembly to the levelling assembly permits exclusion of further tolerances which might occur if the assemblies were positioned separately.

Since the sensor assembly is coupled to the levelling assembly, the thickness of the first powder layer is adjusted in relation to the levelling assembly which subsequently moves over the build platform or the base plate once or repeatedly, for the purpose of applying the first powder layer to be processed. As an alternative, it may be provided that the sensor assembly and the levelling assembly are jointly, however separately from each other, received by a guide positioned in relation to the build platform, with the result that the levelling and sensor assemblies move over the build platform or the base plate either displaced in time or independently of each other.

Advantageously, a sensor level of the sensor assembly is set to the levelling level of the levelling assembly. This facilitates the adjustment of the thickness of the first powder layer. By arranging the sensor level and the levelling level in accordance with each other, the distance by which the build platform is lowered in relation to the sensor level corresponds to the exact thickness of the first powder layer.

According to an advantageous embodiment of the method, the intermediate position of the build platform, before it is moved to a starting position for application of the first powder layer, is detected in a tactile manner. Thereby, safe detection of the intermediate position may be given at high temperatures in excess of 250 degrees C.

According to a further advantageous embodiment of the method, different potentials are applied to the build platform and the sensor assembly or their electric resistances are detected. As soon as the build platform or the base plate contacts the sensor assembly in an intermediate position, there will be a change in potential or resistance. The signal generated thereby is output to a drive of the build platform either directly or via an evaluation and control unit, for the purpose of stopping the lifting motion. The build platform is stopped such that the position of the build platform at the moment of signal generation is stored. Owing to its inertia, the build platform does not stop immediately, but travels for a certain braking distance. The position of the build platform is corrected by the braking distance and the intermediate position is assumed. Thereafter, the drive, particularly a servo-drive, can move the build platform from that intermediate position to the starting position, wherein distance sensors, incremental encoders or the like are used to exactly adjust and monitor the distance travelled from the intermediate position to the starting position.

Preferably, the sensor assembly is attached such that it is electrically isolated from the levelling assembly. In this manner, it is possible to ensure that the sensor assembly effects a change in the potential or the electric resistance immediately when it contacts the build platform or the base plate, which is evaluated as a signal that the intermediate position has been reached. At the same time, the sensor assembly and the levelling assembly can be provided in compact design and next to each other, particularly at a joint holding device.

Hence, this method according to the invention is advantageous in that it allows automatic adjustment of a starting position of the build platform for generative machining, particularly for selective laser melting. By electronically detecting an intermediate position and by subsequently moving the build platform by a defined distance for the purpose of adjusting the exact thickness of the first powder layer, it is possible to compensate thermal elongations, with the result that process safety is increased and incorporation in an automated production process is enabled.

The object of the invention is solved by a sensor unit which is particularly provided for applying the method described above. The sensor unit comprises at least one sensor assembly with at least one sensor element for tactile signal detection, wherein said sensor element can be displaced in one direction in space. As a result, a signal is generated and detected reliably, despite high temperatures, immediately when the build platform or the base plate attached thereupon is contacted by a sensor element. Owing to the flexibility of the sensor elements, the sensor assembly can be used under different initial conditions, reliably causing the adjustment of the build platform in a starting position for applying an exact thickness of the first powder layer.

Advantageously, it is provided that at least one sensor element of the sensor assembly is designed electrically conducting. This permits detection of a change in potential or resistance when the at least one sensor element on the build platform or the base plate is contacted, said change being output as a signal for stopping the feed motion of the build platform.

Preferably, the sensor assembly and the levelling assembly are received by a common holding device, wherein the distance of the sensor assembly from the levelling assembly exceeds a displacement of a free length of the sensor and levelling elements. This ensures that a contact of the sensor and levelling elements between the sensor assembly and the levelling assembly is prevented in order to allow unique signal detection.

According to a further advantageous embodiment of the sensor unit, it is provided that the sensor assembly is positioned on the holding device such that it is electrically isolated from the levelling assembly. This can be achieved by means of a non-conducting interlayer, such as a paint coat, by a foil or by non-conducting elements. Alternatively, the holding device may be made of a non-conducting material. Furthermore, the conducting sensor elements may be received in a non-conducting terminal strip which is mounted in the holding device in an exchangeable manner. Thereby, the sensor assembly and the levelling assembly can be arranged immediately adjacent to each other and received at a joint holding device in a moving manner, whereby additional drives or positioning mechanisms for the sensor assembly are not necessary. The joint arrangement at the holding device is, furthermore, advantageous in that the sensor level of the sensor elements is provided at the levelling level of the levelling elements, with the result that there are simple conditions for adjusting a starting position.

According to a preferred embodiment of a sensor unit, the sensor assembly is designed as a strip of brushes with a plurality of sensor elements, said strip of brushes corresponding to a strip of brushes of the levelling assembly with a plurality of levelling elements. The identical design of the components for the levelling assembly and the sensor assembly allows to achieve a reduction in cost. In addition, the conditions prevailing when the levelling assembly and the sensor assembly move over the bottom area and the build chamber are identical.

Advantageously, the free ends of the sensor elements are arranged in one plane, forming a sensor level. As a result, the measurement certainty can be increased. In addition, it is possible to monitor the total width of the build chamber under identical conditions.

It is preferably provided that the sensor level is arranged in a plane extending in parallel with the build platform. This ensures identical conditions along the build platform for application of the exact thickness of the first powder layer.

According to a further advantageous embodiment of the sensor unit, it is provided that the levelling assembly comprises at least a length which exceeds a dimension of the build platform or of the base plate extending in transverse direction in relation to the travel direction of the levelling assembly and that the at least one sensor element comprises a length which is equal to or less than the dimension of the build platform or of the base plate extending in transverse direction in relation to the travel direction of the levelling assembly. As a result, the sensor assembly can exactly detect the position of contact between the sensor assembly that is designed as a strip of brushes and the build platform or the base plate. Over and above this, this embodiment is advantageous in that, for example while prefabricated moldings are being treated, exact detection of the intermediate position of the build platform is enabled irrespective of their geometry and extension in the plane of the build platform or the base plate.

According to a further advantageous embodiment of the sensor unit, it is provided that the sensor element that is designed as a strip of brushes comprises bristles made of a heat-resistant material, in particular carbon fibers. These are particularly wear-resistant and comprise a long service life at increased temperatures in excess of 250 degrees C., particularly at temperatures of up to 600 degrees C. for tactile signal detection.

BRIEF DESCRIPTION OF THE DRAWINGS

Below, the invention as well as further advantageous executive forms and further developments thereof will be described and illustrated in more detail by means of the examples represented in the drawings. According to the invention, the elements disclosed in the description and the drawings can be used separately or in any combination and number desired. In the figures.

DETAILED DESCRIPTION OF PREFERRED EMBODIMENTS

Figure 1:
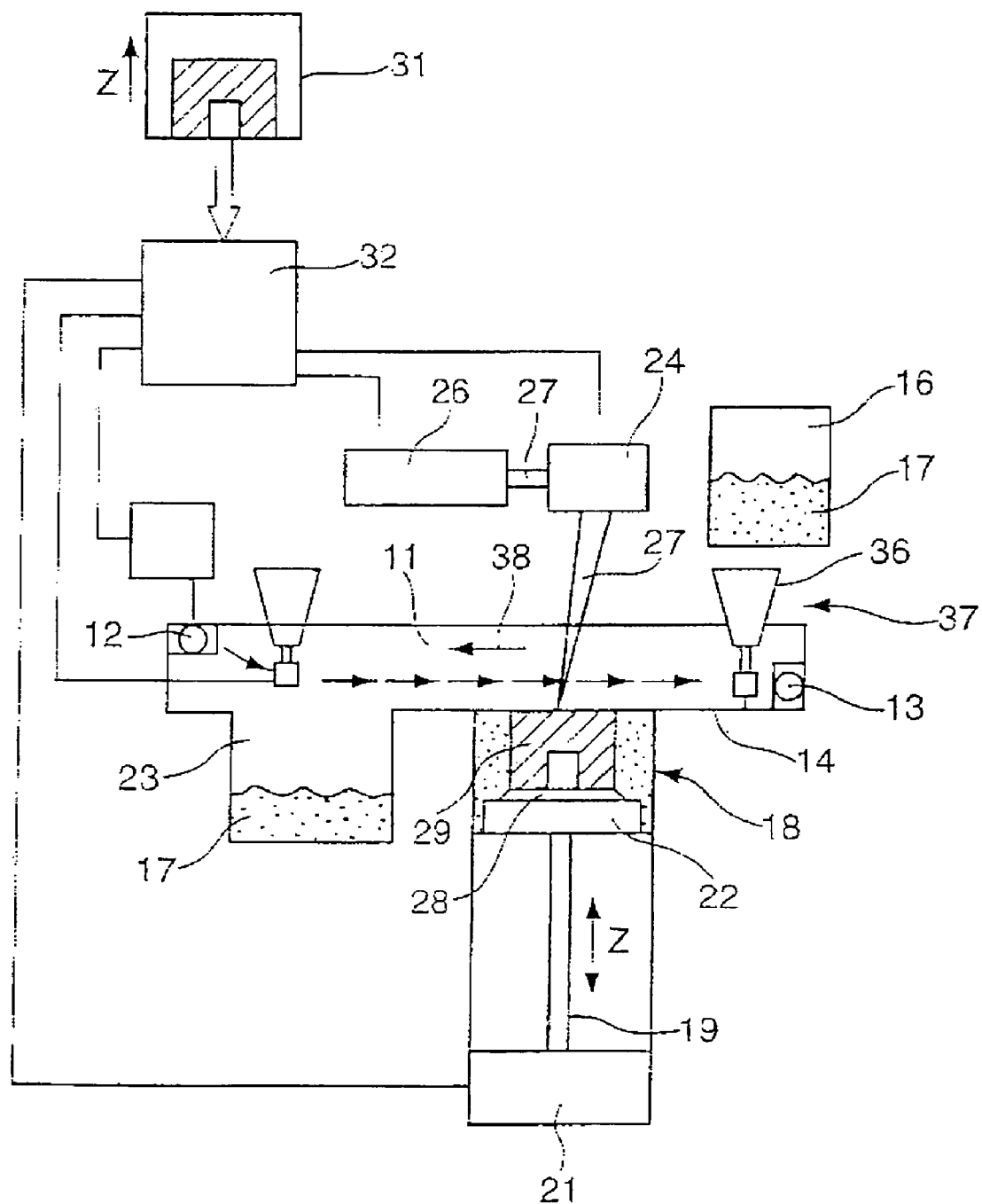
FIG. 1 is a schematic diagram of an apparatus for the manufacture of a molding by selective laser melting.

FIG. 1 shows an apparatus for selective laser melting, such as it is, for example, described in DE 198 53 978 C1. Said apparatus comprises a process chamber 11 with a protective gas inlet 12 and a protective gas outlet 13. A storage tank 16 that is filled with material powder 17 is provided above a bottom area 14. For example, the powder used may be steel, titanium or aluminum. A build chamber 18 ends in the bottom area 14 from below, wherein a build platform 22 driven by a drive 21 via a lifting screw 19 is arranged in said build chamber 18. A base plate 28 is arranged on the build platform 22 in a detachable manner. A collection tank 23 for the material powder 17 is provided next to the build chamber 18. A displacement assembly 24 directing a laser beam 27 generated by a laser 26 onto the build platform 22 or base plate 28 is provided above the build chamber 18.

In order to produce a molding 29, for example a prototype of a component, the component coordinates are, in a first step, entered in a central processing unit 32 via an input unit 31. After the data has been processed appropriately, the build platform 22 is, in the build chamber 18, moved to a starting position (as will be described in more detail below) where the build platform 22 and the base plate 28 are arranged below the level of the bottom area 14 according to a powder layer thickness to be applied. A predefined volume of fine-grain material powder 17 is filled from the storage tank 16 into a receiving tank 36 of an application unit 37. To apply the material powder 17, the application unit 37 is moved in application direction 38 over the bottom area 14 and to the collection tank 23 at least once over the molding 29 to be built. In this end position, the material powder 17 that is not required is filled into the collection tank 23. It can also be provided that the application unit 37 is moved over the molding 29 repeatedly, wherein the application unit 37 is positioned over the collection tank 23 at the end of the travel distance only.

After a predefined thickness of the powder layer has been applied, the laser 26 and the displacement assembly 24 are activated to direct the laser beam 27 onto the material powder 17 present above the build platform 22 and/or the base plate 28 and, according to coordinates, to fuse that amount of powder that corresponds to the bottommost layer of the molding 29. After the bottommost layer of the molding 29 has been built, the build platform 22 is moved down by a defined distance, so that the upper side of the first layer is positioned below the level of the bottom area 14 of the process chamber 11. Thereafter, the application unit 37 is actuated again in order to apply a defined powder layer to the molding 29.

Figure 3:
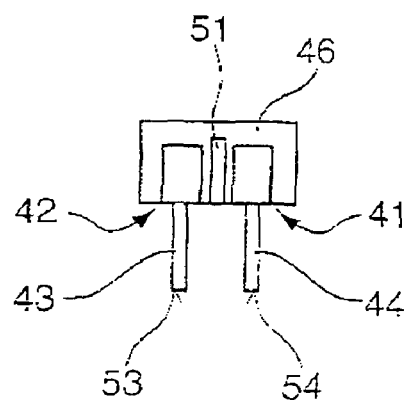
FIG. 3 is a schematic lateral view of the levelling and sensor assemblies.
Figure 4:
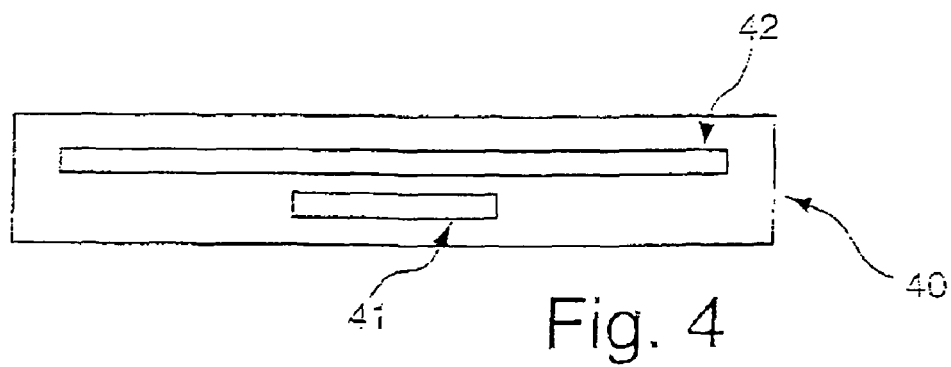
FIG. 4 is a schematic bottom view of the levelling and sensor assemblies according to FIG. 2.

Exact positioning of the build platform 22 for application of a first powder layer is of essential importance for the manufacture of such moldings 29. By maintaining the first layer thickness exactly, the adhesion of the components to the build platform 22 or to a base plate 28 mounted on the build platform 22 in a detachable manner is determined. Furthermore, the build platform 22 or the base plate 28 can be prevented from colliding with a rigid levelling assembly, such as a grinding shaft. A sensor unit 40, which is shown in more detail in FIGS. 2 to 4, is provided for exact adjustment of a starting position of the build platform 22.

Figure 2:
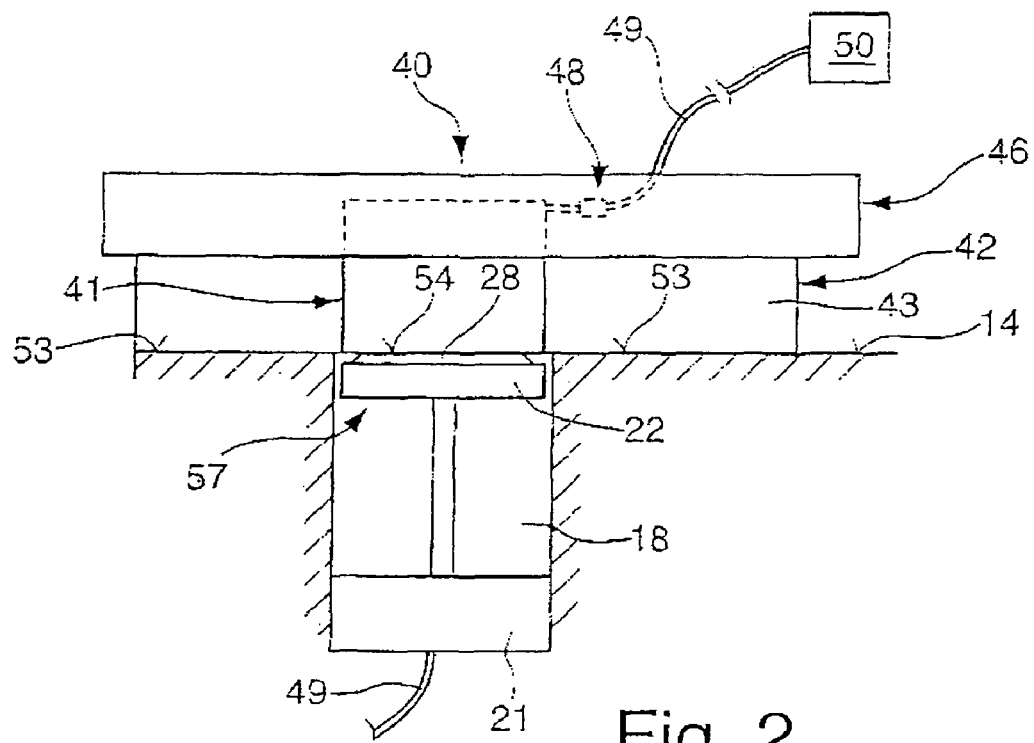
FIG. 2 is an enlarged schematic diagram of a levelling assembly with a sensor assembly according to the invention.

FIG. 2 is a schematic lateral view of a sensor unit 40 comprising a sensor assembly 41 which, in the illustrated instance, is arranged at a holding device 46 jointly with a levelling assembly 42. The holding device 46 is provided at the lower end of the receiving tank 36 (not shown in FIG. 2), thus causing the levelling assembly 42 to level the material powder to a predefined layer thickness in the build chamber 18, while the application unit 37 (not shown in FIG. 2) moves back and forth. As regards the method of operation of the levelling assembly 42 as well as the options of its design, full-content reference is made to EP 1 234 625 A1.

The levelling assembly 42 comprises a plurality of levelling elements 43 that are arranged next to each other and are designed as bristles or the like and are, for example, arranged in the form of a strip of brushes. Preferably, the levelling elements 43 are made of a heat-resistant material, particularly carbon fiber. The strip of brushes is attached to the holding device 46 in an exchangeable manner. Preferably, the levelling elements 43 of the strip of brushes comprise identical lengths and form a levelling level 53, so as to permit the applied material powder to be stripped off on the bottom area 14 while said levelling elements 43 move over the bottom area 14 once or repeatedly, at the same time ensuring that the material powder is leveled in the build chamber 18.

The sensor assembly 41 is attached to the holding device 46 in an exchangeable manner, representing a component of the sensor unit 40. Analogously to the levelling assembly 42, the sensor assembly 41 comprises a plurality of sensor elements 44 that are arranged next to each other and are, for example, designed as fibers or bristles of a strip of brushes. Preferably, the same strip of brushes as that of the levelling assembly 42 is provided as sensor assembly 41. Furthermore, a plug contact 48 is provided at the sensor assembly 41, in order to contact a signal line 49 which can be connected to an evaluation and control unit 50. As an alternative, the signal line 49 can also be soldered, screwed or crimped directly to the strip of brushes or to the fixing device for the sensor elements 44.

The maximum length of the sensor assembly 41 is equal to or less than a dimension of the build platform 22 or the base plate 28 extending in transverse direction in relation to the travel direction of the levelling assembly 42 and the sensor assembly 41. This allows to move fully over and uniformly level a powder layer for the first layer to be treated of the molding 29. The length of the levelling assembly 42 is at least a little in excess of the maximum dimension of the build platform 22 or the base plate 28, which extends in transverse direction in relation to the travel direction.

Figure 5A:
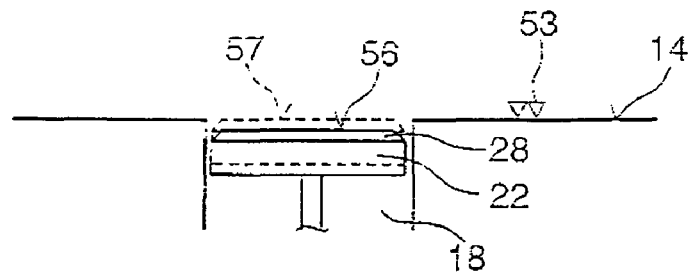
FIGS. 5a-c are schematic views of the adjustment of a starting position of a build platform in various initial situations.

The build platform 22 is arranged in an intermediate position 57 in the build chamber 18; FIG. 5a illustrates in more detail how said intermediate position 57 is assumed as well as positioned in relation to the sensor assembly 41.

FIG. 3 is a schematic lateral view of a levelling assembly 42 and a sensor assembly 41, which are jointly received by a holding device 46. An electric insulation 51, which can be designed as an insulating layer, is provided therebetween. This ensures that any electric contacting between the levelling assembly 42 and the sensor assembly 41 is prevented. The distance of the levelling assembly 42 from the sensor assembly 41 is provided such that a contact of the levelling elements 43 is excluded when the sensor elements 44 are displaced.

The reception of the levelling assembly 42 and the sensor assembly 41 at a joint holding device 46 allows to ensure that a levelling level 53 can be adjusted congruently with the sensor level 54 in a simple manner, wherein the levels 53 and 54 are each formed by the free ends of the levelling and sensor elements 43, 44.

FIG. 4 is a bottom view of the holding device 46 receiving the sensor assembly 41 and the levelling assembly 42.

The arrangements and designs of the levelling assembly 42 and the sensor assembly 41 shown in FIGS. 2 to 4 are examples. In some cases of application, the levelling assembly 42 may be formed of a plurality of strips of brushes that are arranged next to each other. To form a levelling assembly 42, it is likewise possible to provide two or more rows of strips of brushes that are arranged one behind the other. The sections of strips of brushes arranged in a line can also be arranged spaced apart from each other wherein, in an arrangement comprising one or more rows, each gap between two sections of brushes is preferably closed by the at least one adjacent row.

An alternative executive form, that is not illustrated in more detail here, provides that the holding device 46 consists of two separate parts which can be moved in parallel to the bottom area 14 independently of each other. The principal structure, however, is the same, so that a joint adjustment of the levelling level 53 of the levelling assembly 42 and the sensor level 54 of the sensor assembly 41 is likewise enabled.

Figure 5B:
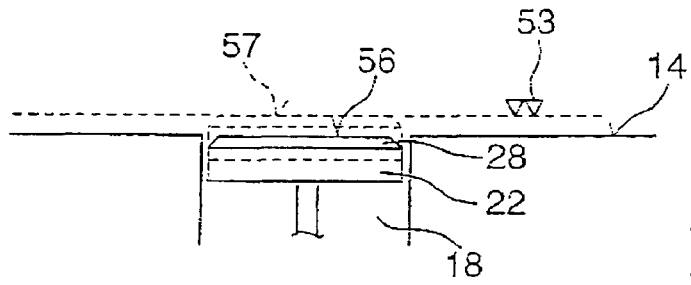
Figure 5C:
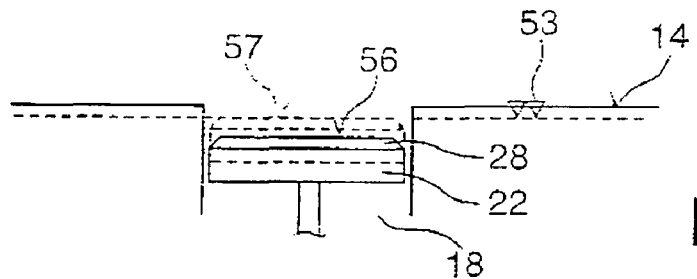

FIGS. 5a to 5c are schematic views of various initial situations in a process chamber 11, allowing the adjustment of a starting position 56 of a build platform 22 for application and solidification of a first powder layer.

FIG. 5a shows an initial situation which is, ideally, provided for an arrangement according to FIG. 1. The method according to the invention for adjusting a starting position 56 is described as follows: The levelling level 53 and the sensor level 54 are adjusted in a basic setting, preferably in a joint plane. The levelling level 53 is preferably positioned in the bottom area 14 so that, after material powder has been applied, excess powder is stripped off from the bottom area 14, but the build chamber 18 is leveled with material powder flush with the bottom area 14.

Starting from this basic setting, the sensor assembly 41 is moved to the build chamber 18 such that it is positioned above the build chamber 18. The sensor assembly 41 is positioned above the build platform 22 or the base plate 28 at least such that a contact with the neighboring bottom area 14 is prevented. Beforehand, at the same time or thereafter, the drive 21 moves the build platform 22 in the direction towards the sensor assembly 41. The build platform 22 and the sensor assembly 41 are each connected to an evaluation unit 50 via a signal line 49 (see FIG. 2). As soon as the build platform 22 or the base plate 28 mounted on the build platform comes into contact with the sensor assembly 41, there will be a change in electric resistance or potential. This change is detected as a signal for stopping the build platform 22 through the drive 21. The build platform 22 is stopped such that the position of the build platform 22 at the moment of signal generation is stored. Owing to its inertia, the build platform 22 does not stop immediately, but travels for a certain braking distance. The position of the build platform 22 is corrected by the braking distance. As a result, the build platform 22 is arranged in an exactly defined intermediate position 57 (indicated in dashed lines) and, starting from said intermediate position 57, assumes the starting position 56. Therein, the drive 21 moves the build platform 22 down in the build chamber 18 for a predefined distance which corresponds to the thickness of the first power layer to the applied. This ensures that the exact measure of the first thickness is maintained irrespective of any thermal elongations of the build platform 22 and/or the base plate 28, the build chamber 18 or further components.

A multi-functional analog measuring module with preferably adjustable switching thresholds is used for evaluating the measured variable and generation of the switching signal on contact of the sensor assembly 41. This structure allows to achieve a reproducibility of the contact position of ±0.01 mm, making evident that, starting therefrom, an exact adjustment of the thickness of the first powder layer is ensured.

Alternatively to the signal generation described above, it can be provided that the build platform 22 or a base plate 28 mounted thereupon is designed such that it is electrically conducting and the bottom area 14 is designed such that it is not electrically conducting. As soon as the sensor assembly 41 is contacted, any change in potential or resistance is again generated and detected. However, this arrangement enables the sensor assembly 41 and the levelling assembly 42 to be combined in a joint assembly and used for the method according to the invention.

FIG. 5b shows an instance where the levelling level 53 of the levelling assembly 42 is positioned above the bottom area 14. This arrangement is, above all, used with a rigid levelling assembly, such as a grinding shaft, in order to prevent the grinding shaft from dragging over the bottom area 14. The build platform 22 is moved up until it or the base plate 28 has come to bear against or into contact with the sensor assembly 41 and the intermediate position 57 is detected. The intermediate position 57 is elevated in relation to the bottom area 14 wherein, owing to the levelling level 53 being positioned above the bottom area 14, a corresponding powder layer remains on the bottom area 14. Subsequently, the build platform 22 is lowered by the measure of the thickness of the first powder layer to assume the starting position 56, wherein the starting position 56 may also be elevated in relation to the bottom area 14.

FIG. 5c shows a further case of application where the levelling level 53 is positioned below the bottom area 14. The design of the sensor assembly 41 which, in transverse direction in relation to the travel direction, comprises a length which is equal to or less than the dimension of the build platform 22 or the build chamber 18 permits the sensor elements 44 to project into the build chamber 18. As a result, the build platform 22 assumes an intermediate position 57 which is positioned below the bottom area 14. Subsequently, the build platform 22 is lowered to assume the starting position 56.

The sensor assembly 41 formed as a brush is advantageous in that it does not affect the levelling of the powder layer and stripping off of excess material powder, irrespective of the case structures mentioned above. On the contrary, there may be additional support. Over and above this, this sensor assembly 41 allows to utilize the entire size of the build platform 22 for building the molding 29. Additional mechanical components or drives for positioning the sensor assembly 41 such that it assumes the starting position 56 towards the build chamber 18 are not necessary.

The case structures described above which may occur in relation to various thermal expansions and through tolerances in adjustment are eliminated by the method according to the invention for the adjustment of a starting position 56 as well as by the sensor unit 40 according to the invention.

Figure 6:
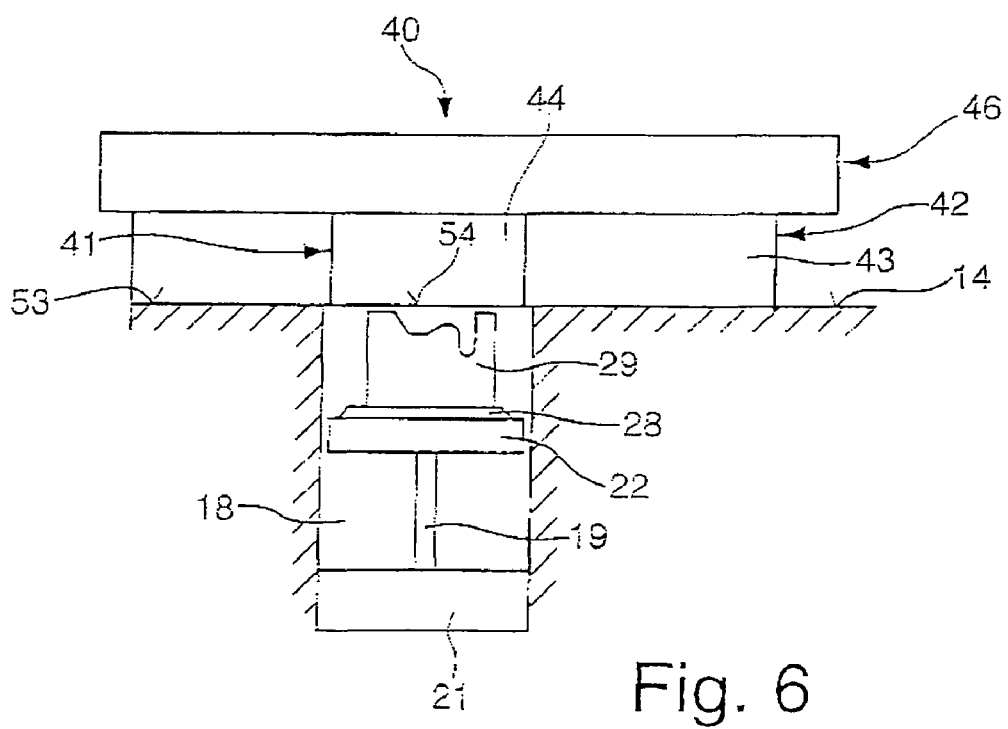
FIG. 6 is a schematic lateral view of a levelling and sensor assembly while the build platform is positioned in a starting position with a molding.

FIG. 6 illustrates a further application example. A preformed molding 29 is applied onto the build platform 22 or the base plate 28, and it is intended to apply further regions and/or layers onto said molding 29 through generative methods, in particular through selective laser melting. Furthermore, a molding 29 which is damaged at its surface, said damage having to be repaired, can be applied onto the build platform 22 or the base plate 28. Either of these cases of application again requires that the first powder layer to be applied must have an exact thickness in order to ensure that good adhesion to the solidified layer or to the molding 29 is enabled. The starting position 56 is adjusted via an intermediate position 57, as it is described in FIGS. 5a to c.

What is claimed is:

1. A method for the manufacture of a molding through generative processing methods, in particular through selective laser melting, wherein a model of a molding is built from a powder material according to CAD data, wherein an application unit is used to apply a powder layer and the powder layer applied is fixed to a layer arranged there under or a base plate by means of radiation, characterized in that prior to applying a first layer onto a build platform or a base plate, a sensor assembly having a sensor level which is located in relation to the levelling level of a levelling assembly for the applied powder layer is allocated to the build platform or the base plate, the build platform or the base plate is moved in relation to the sensor assembly until the sensor assembly emits a signal for stopping the build platform to a drive in an intermediate position, and starting from the intermediate position, the build platform or the base plate is moved by a distance to adjust the layer thickness of the first powder layer and is positioned in a starting position.

2. A method according to claim 1, characterized in that a holding device receiving the sensor assembly and the levelling assembly moves over the build platform or the base plate.

3. A method according to claim 1, characterized in that the sensor level of the sensor assembly is adjusted to the levelling level of the levelling assembly.

4. A method according to claim 1, characterized in that the positioning of the build platform or the base plate in the intermediate position is detected by the sensor assembly in a tactile manner.

5. A method according to claim 1, characterized in that different potentials are applied to the sensor assembly and the build platform or the base plate or their electric resistance is measured and that the change in potential or resistance is detected in the intermediate position and output to the drive as a stop signal.

* * * * *